United States Patent

Kimura et al.

Patent Number: 5,987,182
Date of Patent: Nov. 16, 1999

[54] MARKOV MODEL IMAGE ENCODING DEVICE AND METHOD

[75] Inventors: Shunichi Kimura; Setsu Kunitake; Taro Yokose; Yutaka Koshi; Koh Kamizawa, all of Nakai-machi, Japan

[73] Assignee: Fuji Xerox Co., Ltd., Tokyo, Japan

[21] Appl. No.: 08/876,484

[22] Filed: Jun. 16, 1997

[30] Foreign Application Priority Data

Jun. 27, 1996 [JP] Japan ................................. 8-166966

[51] Int. Cl.⁶ .................................................. G06K 9/36
[52] U.S. Cl. ........................ 382/239; 382/251; 382/238
[58] Field of Search ................................. 382/232, 236, 382/242, 243, 239, 233, 248, 251, 253, 238; 341/107, 51, 73, 76; 348/416, 415; 358/426

[56] References Cited

U.S. PATENT DOCUMENTS

| | | | |
|---|---|---|---|
| 5,297,220 | 3/1994 | Nomizu | 382/247 |
| 5,491,564 | 2/1996 | Hongu | 382/239 |
| 5,764,804 | 6/1998 | Yajima et al. | 382/238 |

OTHER PUBLICATIONS

Compression of Image Information, pp. 171 to 176, OHM Co., Ltd., (1991).

A Study of Still Image Prediction Based on Learning Markov Model (Proceedings of the 1995 IEICE General Conference, D–284, (1995).

*Primary Examiner*—Thomas D Lee
*Assistant Examiner*—Wenpeng Chen
*Attorney, Agent, or Firm*—Oliff & Berridge, PLC

[57] ABSTRACT

A plurality of reference pixel extracting means check their corresponding reference pixel ranges and pixel values in predetermined auxiliary regions. Reference pixel range selecting means selects a reference pixel range based on the checked pixel values. When the number of types of pixel values for an input image is found to be locally low in the selected reference pixel range, the number of reference pixels is increased. On the other hand, when the number of types of the pixel values for the input image is found to be locally large, the number of reference pixels is decreased. As a result, states can be generated by a Markov model image encoding system capable of improving encoding efficiency without increasing the number of the states sharply. Owing to the above construction, even when the number of tones for the input image is high upon Markov model image encoding, the number of reference pixels can be increased without abruptly increasing the number of states later on to improve compression efficiency.

28 Claims, 12 Drawing Sheets

EXAMPLE 1 OF REFERENCE PIXELS

|  |  |  |  |  |  |  |  |  |  |  |  |  |
|---|---|---|---|---|---|---|---|---|---|---|---|---|
|  |  |  |  |  |  |  |  |  |  |  |  |  |
|  |  |  |  |  |  | x2 |  |  |  |  |  |  |
|  |  |  |  |  | x1 | x0 |  |  |  |  |  |  |

FIG.2

EXAMPLE 2 OF REFERENCE PIXELS

|  |  |  |  |  |  |  |  |  |  |  |  |  |
|---|---|---|---|---|---|---|---|---|---|---|---|---|
|  |  |  |  |  |  | x6 |  |  |  |  |  |  |
|  |  |  |  |  | x3 | x2 | x4 |  |  |  |  |  |
|  |  |  |  | x5 | x1 | x0 |  |  |  |  |  |  |

FIG.3

EXAMPLE 3 OF REFERENCE PIXELS

| | | | | | | x12 | | | | | | |
|---|---|---|---|---|---|---|---|---|---|---|---|---|
| | | | | | x11 | x7 | x6 | x10 | | | | |
| | | | | | x9 | x3 | x2 | x4 | | | | |
| | | | | | x5 | x1 | x0 | | | | | |

FIG.4

RELATIONSHIP BETWEEN NUMBER OF REFERENCE PIXELS,
NUMBER OF PIXEL-VALUE TYPES AND NUMBER OF STATES

| NUMBER OF SIGNAL TYPES | | NUMBER OF REFERENCE PIXELS | NUMBER OF STATES TYPES |
|---|---|---|---|
| NUMBER OF PIXEL-VALUE | BITS | | |
| 256 | 8 | 2 | $2^{16}$ |
| 4 | 2 | 6 | $2^{12}$ |
| 2 | 1 | 12 | $2^{12}$ |

FIG.5

TYPE OF PIXEL VALUE

TWO VALUES

| PIXEL VALUE | INDEX |
|---|---|
| 0 | 0 |
| 255 | 1 |

FOUR VALUES

| PIXEL VALUE | INDEX |
|---|---|
| 0 | 0 |
| 64 | 1 |
| 128 | 2 |
| 192 | 3 |

EXAMPLE 1 OF REFERENCE PIXEL RANGE
SELECTING PIXEL RANGE

| A | B | C | D |
|---|---|---|---|
| E | F | G | H |
| ... | ... | ... | ... |
| ... | ... | ... | ... |

EXAMPLE 2 OF REFERENCE PIXEL
RANGE SELECTING PIXEL RANGE

EXAMPLE 2 OF REFERENCE PIXEL
RANGE SELECTING PIXEL RANGE

PIXEL TO BE NOTED

FOUR VALUES

| TYPE OF PIXEL VALUE PATTERN NUMBER | TYPE OF PIXEL VALUE | | | |
|---|---|---|---|---|
| | 0 | 1 | 2 | 3 |
| 1 | 0 | 64 | 128 | 192 |
| 2 | 0 | 100 | 200 | 255 |
| 3 | 52 | 67 | 178 | 204 |
| 4 | 12 | 39 | 55 | 71 |

TWO VALUES

| TYPE OF PIXEL VALUE PATTERN NUMBER | PIXEL-VALUE TYPE | |
|---|---|---|
| | 0 | 1 |
| 1 | 0 | 255 |
| 2 | 0 | 100 |
| 3 | 64 | 128 |

FIG.11

RELATIONSHIP BETWEEN NUMBER OF REFERENCE PIXELS, NUMBER OF PIXEL-VALUE TYPES, NUMBER OF PIXEL-VALUE TYPE PATTERN AND NUMBER OF STATES

| NUMBER OF SIGNAL TYPES | | NUMBER OF REFERENCE PIXELS | NUMBER OF PIXEL-VALUE TYPE PATTERN | NUMBER OF STATES TYPES |
|---|---|---|---|---|
| NUMBER OF PIXEL-VALUE | BITS | | | |
| 256 | 8 | 2 | 1 | $2^{16}$ |
| 4 | 2 | 6 | 4 | $2^{12} \times 4$ |
| 2 | 1 | 12 | 3 | $2^{12} \times 3$ |

FIG.12

DESCRIPTION OF PIXEL-VALUE TYPE
STORING MEANS

| DELETING ORDER | TYPE OF PIXEL VALUE | | | |
|---|---|---|---|---|
| | 0 | 1 | 2 | 3 |
| 1 | 0 | 64 | 128 | 192 |
| 2 | 0 | 100 | 200 | 255 |
| 3 | 52 | 67 | 178 | 204 |
| 4 | 12 | 39 | 55 | 71 |

PIXEL-VALUE TYPE PATTERN GENERATED

| 100 | 128 | 156 | 198 |
|---|---|---|---|

| DELETING ORDER | TYPE OF PIXEL VALUE | | | |
|---|---|---|---|---|
| | 0 | 1 | 2 | 3 |
| 1 | 0 | 100 | 200 | 255 |
| 2 | 52 | 67 | 178 | 204 |
| 3 | 12 | 39 | 55 | 71 |
| 4 | 100 | 128 | 156 | 198 |

DESCRIPTION OF CONVENTIONAL
REFERENCE PIXELS

|   |   |   |   |   |   | b |   |   |   |   |   |   |
|---|---|---|---|---|---|---|---|---|---|---|---|---|
|   |   |   |   |   | a | X |   |   |   |   |   |   |

FIG.17

DESCRIPTION OF CONVENTIONAL ENCODING
(HUFFMAN ENCODING) SYSTEM

| REFERENCE PIXEL | | STATE NUMBER | HUFFMAN-ENCODED CODE TABLE | | | |
|---|---|---|---|---|---|---|
| a | b | | 0 | 1 | 2 | 3 |
| 0 | 0 | 0 | 00 | 01 | 10 | 11 |
| 0 | 1 | 1 | 1 | 01 | 001 | 0001 |
| 0 | 2 | 2 | 01 | 1 | 001 | 0001 |
| ... | ... | ... | ... | ... | ... | ... |
| 3 | 3 | 15 | 001 | 1 | 011 | 0001 |

FIG.18

DESCRIPTION OF CONVENTIONAL ENCODING
(DIFFERENTIAL) SYSTEM

| REFERENCE PIXEL | | STATE NUMBER | PREDICTED VALUE |
|---|---|---|---|
| a | b | | |
| 0 | 0 | 0 | 0 |
| 0 | 1 | 1 | 0 |
| 0 | 2 | 2 | 2 |
| ... | ... | ... | ... |
| 3 | 3 | 15 | 3 |

MARKOV MODEL IMAGE ENCODING DEVICE AND METHOD

BACKGROUND OF THE INVENTION

1. Field of the Invention

The present invention relates to an image encoding device using a Markov model encoding system, and particularly to an image encoding device for improving compression efficiency without increasing a code table.

2. Description of the Related Art

The Markov model encoding is already known. An example of a Markov model encoding system described in, for example, pages 171 to 176 of "Compression of Image Information" (Ohm Co., Ltd.). In the Markov model encoding, an actual image is encoded on the assumption that the probability to determine which value would be taken or assumed as a pixel value of a given pixel, or a state thereof other than the pixel value or an index thereof, will depend on determining to which values a previous finite number of pixel values, states or indexes correspond. The pixel value, state and index will be described below on the condition that they are collectively referred to as "pixel values". The probability that a noted pixel to be encoded will be a given pixel value, will depends on patterns defined by values of m pixels preceding the noted pixel. If a conditional probability of the value of the noted pixel remains unchanged even if the preceding pixels are defined as m+1, then such an information source will be called "m-th order Markov source". The m pixels preceding the noted pixel will hereinafter be referred to as "reference pixels".

The value of the noted pixel will be defined as x(i) and the values of the m reference pixels will be defined as x(i−1), x(i−2), ..., x(i−m). Assuming that a coupling probability is defined as P(x(i), x(i−1), x(i−2), ..., x(i−m)) and a conditional probability is defined as P(x(i)|x(i−1), x(i−2), ..., x(i−m)), an entropy H of the m-th order Markov source is given by the following equation:

$$H = \sum_{x(i-m)=0} \cdots \sum_{x(i)=0} P(x(i), x(i-1), x(i-2), \ldots, x(i-m)) \times$$

$$\log_2 P(x(i) \mid x(i-1), x(i-2), \ldots, x(i-m))$$

This equation shows a theoretical compression limitation at the time that the preceding m symbols are given and x(i) is encoded. As described in page 174 in the "Compression of Image Information" (Ohm Co., Ltd.), the more the number of reference pixels increases, the more the theoretical compression limitation is reduced. Namely, compression efficiency is improved as the number of the reference pixels increases.

A specific Markov model encoding system is one intended to, for example, separate states from one another using reference pixels, prepare symbol or code tables, e.g. Huffman code tables every states and encode a pixel to be noted in this condition.

A process of generating state numbers from reference pixels will first be described with reference to FIG. 16. In FIG. 16, reference numerals 101, 102, 103, 104, 105 and 106 indicate an input image, an image memory, a reference pixel extracting circuit for extracting a reference pixel from the image memory 102, a value of the reference pixel, a state determining circuit for determining a state from the reference pixel, and a state number determined by the state determining circuit 105, respectively.

The input image 101 is temporarily inputted to the image memory 102. Pixels preceding a noted pixel to be now encoded have already been stored in the image memory 102. The reference pixel extracting circuit 103 extracts the reference pixel 104 corresponding to the noted pixel from the pixels stored in the image memory 102. The reference pixel extracting circuit 103 extracts two pixels of a located just on the left side of the noted pixel and b located just above the noted pixel as reference pixels as shown in FIG. 17, for example. The state determining circuit 105 determines the state number 106 based on the reference pixel 104.

After the determination of the state, encoding is effected on the noted pixel. For example, a code table for Huffman encoding is prepared for each state and the noted pixel is encoded based on the code table. Encoding is effected on the noted pixel in accordance with such a table as shown in FIG. 18, for example. In FIG. 18, the values of each reference pixel and the noted pixel have been described so as to be represented in 2 bits. Symbols or signs indicative of the respective states can be generated by examining the probability of generation of noted pixels assuming the states.

As has been described in "A study of Still Image Prediction Based on Learning Markov Model" (Proceedings of the 1995 IEICE General Conference, D-284, 1995), a system for predicting noted pixels every states after determination of the states is also known. According to this system, predicted values for the noted pixels are prepared with respect to the respective states. Difference encoding or the like is performed using the predicted values.

In either of the above systems, the total number of states becomes $n^m$ when the reference pixels provide n levels of halftone and the number of the reference pixels is m.

In the "A study of Still Image Prediction Based on Learning Markov Model" referred to above, the number of tones of the input image is 256. Namely, a 8-bit image is defined per pixel. When the number of reference pixels for the 8-bit image is 3, the total number of states becomes 256×256×256=$2^{24}$. Storing code tables or predicted values with respect to the respective states is at variance with the reality in terms of a hardware scale or software implementations. Therefore, the number of the reference pixels is set to the two pixels located just above the noted pixel and just on the left side thereof in the above-described "A study of Still Image Prediction Based on Learning Markov Model".

As described above, an improvement in the efficiency of the Markov model encoding needs to increase the number of the reference pixels. However, the prior art has a problem in that if the number of the reference pixels is increased when the tones of the input image are large in number, then the number of the states becomes great, so that hardware or software cannot be implemented or mounted.

However, even if the number of the tones of the input image is 256, there may be a case in which the number of types of pixel values in an actual input image is less than or equal to 256. For example, a two-value image assuming values of 0 and 255 alone and limited tonal images limited to 16 colors, 256 colors, etc. are known as examples of such a case. In this case, the encoding efficiency can be improved with an increase in the number of the reference pixels. However, since a selectable reference pixel range is one type alone in the conventional encoding system, the reference pixel could not be increased in number according to the input.

SUMMARY OF THE INVENTION

With the foregoing in view, it is therefore an object of the present invention to generate states by a Markov model encoding system capable of improving efficiency without an abrupt increase in the number of the states by increasing the number of reference pixels when the number of types of pixel values of an input image is locally few and decreasing the number of the reference pixels when the number of the types thereof is locally great.

According to a first aspect of the present invention, for achieving the above object, there is provided a Markov model image encoding device comprising:

image storing means for storing an input image therein;

reference pixel range determining pixel extracting means for extracting pixels in a corresponding reference pixel range candidate and pixels in each of reference pixel range selecting pixel ranges from the image storing means for each of a plurality of reference pixel range candidates;

reference pixel range selecting means for selecting a reference pixel range from the reference pixel range candidates, based on the values of the pixels extracted by the reference pixel range determining pixel extracting means;

state determining means for determining a state of a pixel to be noted, based on the values of pixels in the selected reference pixel range; and means for encoding the noted pixel, based on the determined state.

In this construction, the types of local pixel values of the input image can be detected. By decreasing the number of reference pixels when the number of the types of the pixel values for the input image is locally great, an abrupt increase in the number of states is restrained and an increase in encoding cost with the increase in the number of states is restrained. On the other hand, when the number of the types of the pixel values for the input image is locally few, the number of the reference pixels is increased. As a result, compression efficiency can be improved.

In this construction as well, the reference pixel range selecting means can select a reference pixel range candidate widest in range as the reference pixel range from reference pixel range candidates in which the values of the pixels in the corresponding reference pixel range candidate and the values of the pixels in each reference pixel range selecting pixel range become pixel values in a pixel-value type set predetermined with respect to the corresponding reference pixel range candidate.

The reference pixel range selecting pixel range is a pixel range in which the number of pixels in a line direction is the number of pixels less than or equal to the number of pixels corresponding to one line and the number of pixels in the direction orthogonal to the line direction is at least one pixel, the boundary between the reference pixel range selecting pixel ranges is predetermined, and the reference pixel range can be selected from a reference pixel range selecting pixel range nearest to a pixel to be noted.

The reference pixel range selecting pixel range is a pixel range in which the number of pixels in a line direction is the number of pixels corresponding to one line and the number of pixels in the direction orthogonal to the line direction is at least one pixel, and the boundary between the reference pixel range selecting pixel ranges may be changed according to the position of a pixel to be noted.

In the above-described construction, pixel-value set storing means for storing pixel-value sets defined in advance every reference pixel range candidates referred to above is further provided and the reference pixel range selecting means can select the reference pixel range from reference pixel range candidates in which a distribution of the values of pixels in the reference pixel range candidate and pixels in the reference pixel range selecting pixel ranges corresponds to the pixel-value sets stored in the pixel-value set storing means about the reference pixel range candidates.

In the above-described construction, pixel-value set changing means is provided together with the pixel-value set storing means. When the above pixel-value distribution does not correspond to the pixel-value sets about all the reference pixel candidates, one pixel-value set is deleted from the pixel-value set storing means and the pixel-value distribution can be newly stored in the pixel-value set storing means as a pixel-value set.

A change in pixel-value set can be performed every regions composed of one line or more, including reference pixel range selecting pixel ranges in which a plurality of boundaries are fixed.

A change in pixel-value set can be performed every reference pixel range selecting pixel ranges in which their boundaries are fixed.

Further, the reference pixel selecting pixel ranges are shifted together with pixels to be noted and a necessary pixel-value set can be changed for each pixel to be noted.

According to a second aspect of the present invention, for achieving the above object, there is provided a Markov model image encoding device comprising:

means for detecting one or more pixel-value sets borne by the values of pixels included in a predetermined range including at least a plurality of reference pixel range candidates every pixels to be noted, with respect to each of the plurality of reference pixel range candidates;

means for selecting a reference pixel range candidate having the maximum number of pixels from reference pixel range candidates associated with pixel-value sets having the minimum number of elements, of the detected pixel-value sets;

means for determining a state of each noted pixel based on the values of pixels in the selected reference pixel range; and means for encoding the noted pixel based on the above state.

Even in the case of this construction, the types of local pixel values of the input image can be detected. By decreasing the number of reference pixels when the number of the types of the pixel values for the input image is locally great, an abrupt increase in the number of states is restrained and an increase in encoding cost with the increase in the number of states is restrained. On the other hand, when the number of the types of the pixel values for the input image is locally few, the number of the reference pixels is increased. As a result, compression efficiency can be improved.

According to a third aspect of the present invention, for achieving the above object, there is provided a Markov model image encoding device comprising:

means for determining a reference pixel range for each pixel to be noted, based on the values of pixels included in a predetermined range;

means for determining a state of the noted pixel based on the values of pixels in the determined reference pixel range; and means for encoding the noted pixel based on the above state.

Even in the case of this construction, the types of local pixel values of the input image can be detected. By decreasing the number of reference pixels when the number of the types of the pixel values for the input image is locally great, an abrupt increase in the number of states is restrained and an increase in encoding cost with the increase in the number of states is restrained. On the other hand, when the number of the types of the pixel values for the input image is locally few, the number of the reference pixels is increased. As a result, compression efficiency can be improved.

BRIEF DESCRIPTION OF THE DRAWINGS

FIG. 2 is a diagram for describing a reference pixel range employed in the first embodiment shown in FIG. 1;

FIG. 3 is a diagram for describing another reference pixel range employed in the first embodiment shown in FIG. 1;

FIG. 4 is a diagram for describing a further reference pixel range employed in the first embodiment shown in FIG. 1;

FIG. 5 is a diagram for explaining the relationship between the number of reference pixels, the number of types of pixel values and the number of states employed in the first embodiment shown in FIG. 1;

FIG. 11 is a diagram illustrating pixel value type storing means employed in the second embodiment shown in FIG. 10;

FIG. 12 is a diagram for describing the relationship between the number of reference pixels, the number of types of pixel values, the number of pixel-value type patterns and the number of states employed in the second embodiment shown in FIG. 10;

FIG. 17 is a diagram for describing reference pixels employed in the conventional encoding device;

FIG. 18 is a diagram for describing a conventional encoding system; and

FIG. 19 is a diagram for describing another conventional encoding system.

DETAILED DESCRIPTION OF THE PREFERRED EMBODIMENTS

Preferred embodiments of the present invention will hereinafter be described with reference to the accompanying drawings.

[First Embodiments]

Figure 1:
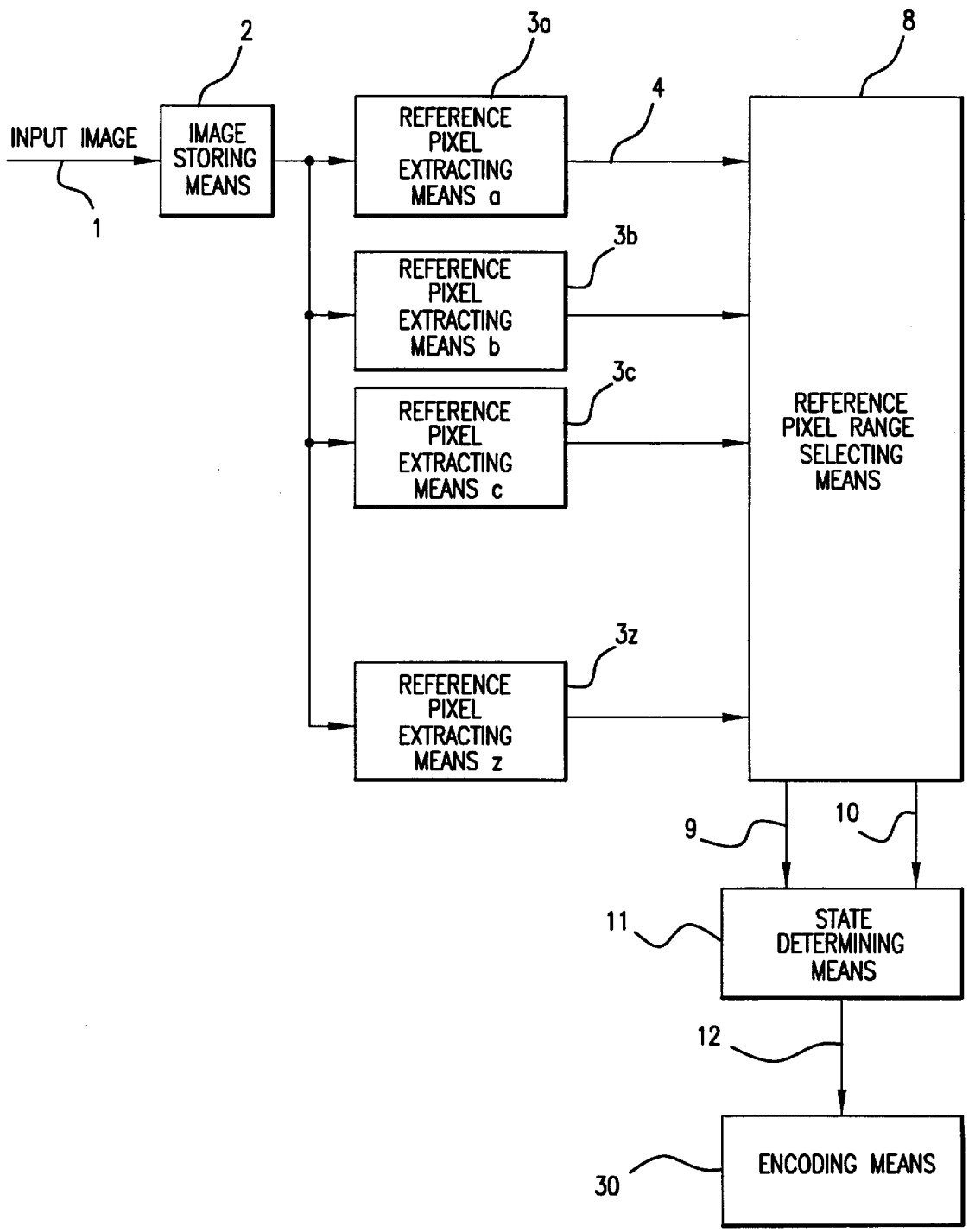
FIG. 1 is a block diagram showing a configuration of a first embodiment of the present invention.

FIG. 1 shows the entire image encoding device according to a first embodiment. In the same drawing, the image encoding device comprises image storing means 2, a plurality of reference pixels extracting means 3 (3a through 3z), reference pixel range selecting means 8, state determining means 11, and encoding means 30 or the like. In this construction, an input image 1 is inputted to the image storing means 2. The reference pixel extracting means 3 takes out or extracts a reference pixel and a reference pixel selecting range 4 from the image storing means 2. The reference pixel and reference pixel selecting range 4 are sent to the reference pixel range selecting means 8. The reference pixel range selecting means 8 selects a reference pixel range and inputs the selected reference pixel range 9 to the state determining means 11. Simultaneously, the reference pixel 10 is inputted to the state determining means 11. The state determining means 11 outputs a state number 12 to the encoding means 30. The encoding means 30 encodes the input image 1 by the known encoding method using a Huffman encoding table, a prediction table or the like allocated for each state number.

The reference pixel range (candidate) is prepared in plural form. For example, three types of reference pixel ranges are prepared. FIG. 2 shows an example in which the number of reference pixels is two. A pixel to be noted is represented as x0 and the reference pixels are represented as x1 and x2. Similarly, FIG. 3 shows an example in which the number of reference pixels is six. The reference pixels are represented as x1 through x6. FIG. 4 also shows an example in which the number of reference pixels is twelve. The reference pixels are represented as x1 through x12.

The reference pixel extracting means 3a extracts the reference pixels x1 and x2 shown in FIG. 2 and a reference pixel range selecting pixel range from the image storing means 2. Similarly, the reference pixel extracting means 3b extracts the reference pixels x1 through x6 shown in FIG. 3 and a reference pixel range selecting pixel range from the image storing means 2. Further, the reference pixel extracting means 3c extracts the reference pixels x1 through x12 shown in FIG. 4 and a reference pixel range selecting pixel range from the image storing means 2. The reference pixel range selecting pixel range is a pixel range defined independent of each reference pixel. The configuration or shape of the pixel range and the number of pixels in the pixel range are held constant without regard to the individual reference pixels. It is determined, based on pixel values in each reference pixel range and pixel values in the reference pixel range selecting pixel range, which reference pixel range would be used.

Figures 6, 7:
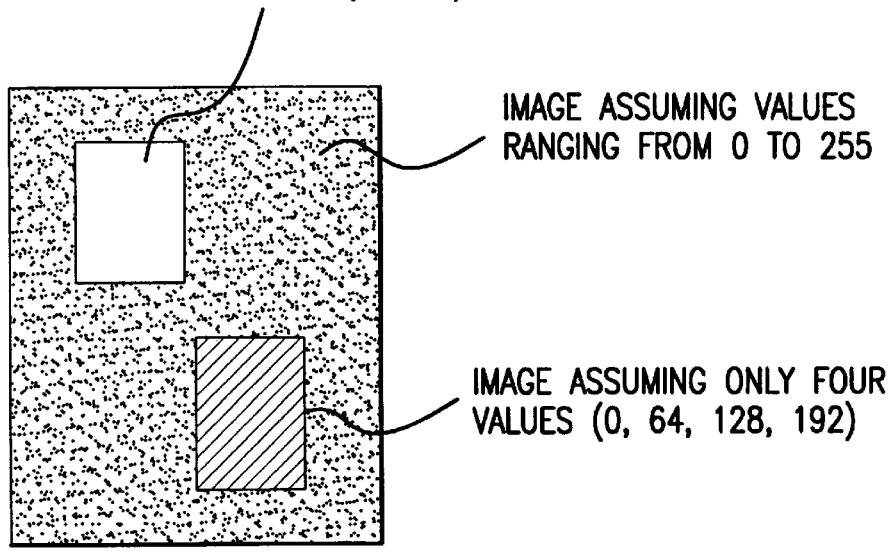
FIG. 6 is a diagram for describing the type of pixel value employed in the first embodiment shown in FIG. 1.
FIG. 7 is a diagram for describing examples of input images employed in the first embodiment shown in FIG. 1.

Now consider where, as shown in FIG. 7 by way of example, an input image is one obtained by combining together an image assuming values ranging from 0 to 255, an image assuming only values 0, 64, 128 and 192 and an image assuming values 0 and 255 alone. In the image assuming only the four values of 0, 64, 128 and 192 and the image assuming only the two values of 0 and 255, the required number of bits can be reduced by using indexes corresponding to their pixel values as shown in FIG. 6. It is therefore possible to increase the number of reference pixels. As shown in FIG. 5 by way of example, the pixel value can be represented in the form of 2 bits when the image assumes the four values, and the pixel value can be represented in the form of 1 bit when the image assumes the two values.

FIG. 5 illustrates the relationship between the number of reference pixels, the number of types of pixel values and the number of states. The relationship between the number of the reference pixels and the number of the pixel-value types is designed so that in order to prevent the number of the states from massively increasing, the number of the pixel-value types is reduced when the number of the reference pixels increases, whereas the number of the pixel-value types is made great when the number of the reference pixels decreases. Thus, the total number of states is restricted to $2^{16}+2^{12}+2^{12}$. If the number of bits is limited to 8 bits and the number of reference pixels is set to 12 without using such a configuration, then the number of states becomes $2^{96}$, so that the design of the above relationship is impracticable.

The reference pixel range selecting means 8 determines whether the pixel values in the respective reference pixel ranges and the reference pixel range selecting pixel range fall within predetermined types of pixel values. Let's now consider that the predetermined types of pixel values are defined as shown in FIG. 6, for example. If x1=64, x2=128, x3=0, x4=0, x5=192 and x6=64 when four values are used, then an image can be encoded by indexes corresponding to the four values. However, since the pixel values do not fall within the above ranges if x1=64, x2=128, x3=0, x4=0, x5=192 and x6=255, the image cannot be encoded by the four-value indexes. In this case, 256 values are used.

Further, the reference pixel range selecting means 8 selects the widest range from within the reference pixel ranges that fall within the predetermined pixel-value types. If, for example, all the 2 values, 4 values and 256 values fall within a predetermined pixel-value range, then the reference pixel range selecting means 8 selects a reference pixel range for the two values. If the 4 values and 256values fall therewithin, then the reference pixel range selecting means 8 selects a reference pixel range for the four values.

The state determining means 11 generates a state number 12 from the selected reference pixel range and reference pixels. When the above relationship is designed as shown in FIG. 5 by way of example, the total number of states becomes $2^{16}+2^{12}+2^{12}$ and hence numbers can be assigned to the respective states so that the states do not overlap each other.

Although the number of the pixel-value types has been described as the three types of 256, 4 and 2, it is not necessarily limited to these.

Figures 8, 9:
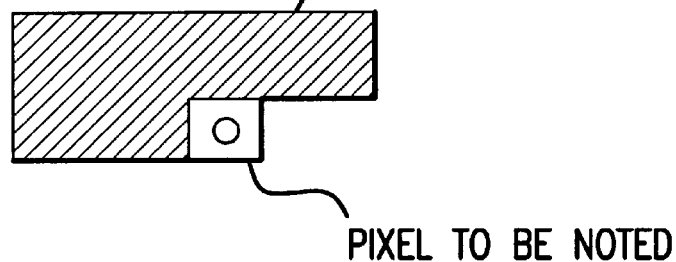
FIG. 8 is a diagram for explaining an example of a reference pixel range selecting pixel range employed in the first embodiment shown in FIG. 1.
FIG. 9 is a diagram for explaining another example of the reference pixel range selecting pixel range employed in the first embodiment shown in FIG. 1.

A description will next be made of the reference pixel range selecting pixel range. The reference pixel range selecting pixel range for determining the type of pixel value can be determined independent of each reference pixel range. A description will first be made of an example in which a candidate for the reference pixel range selecting pixel range has been determined in advance at a predetermined boundary in an input image. As shown in FIG. 8 by way of example, the input image is divided into rectangular regions, each of which will be defined as a reference pixel range selecting pixel range as to a corresponding pixel to be noted. Let's now consider where the noted pixel falls within a region E, for example. At this time, the number of types of pixel values is measured at a region A. A reference pixel range is determined by utilizing the type of pixel value at the region A and the types of pixel values in the respective reference pixel ranges (e.g. FIGS. 2, 3 and 4) as to the noted pixel in combination. The pixel-value type is selected in which the number of types of pixel values at the time that the pixel-value type at the region A and the pixel-value type in each reference pixel range as to the noted pixel are utilized in combination, is minimized. Similarly, if the pixel to be noted falls within a region F, then a reference pixel range is decided by utilizing the type of pixel value at a region B and the type of pixel value in each reference range as to the noted pixel in combination.

Further, the reference pixel range selecting pixel range may be shifted according to the position of the pixel to be noted. As illustrated in FIG. 9, for example, a reference pixel range selecting pixel range is set around the pixel to be noted. When a reference pixel range falls within the reference pixel range selecting pixel range in this case, the reference pixel range is determined based on the number of types of pixel values in the reference pixel range selecting pixel range. On the other hand, when the reference pixel range does not fall within the reference pixel range selecting pixel range, the pixel-value type is selected in which the number of types of pixel values at the time that the pixel-value type in the reference pixel range selecting pixel range and the pixel-value type in each reference pixel range as to the noted pixel are utilized in combination, is minimized.

Eventually, according to the present embodiment, the pixel-value type (pixel-value set) capable of representing the pixels included in the reference pixel range selecting pixel range or each reference pixel range is first determined. The pixel-value set is prepared in plural form. Further, identifiers such as intrinsic indexes, etc. are assigned to respective elements (pixel values) of the pixel-value sets. A pixel-value set lowest in the number of elements is selected from the pixel-value sets capable of representing the pixels included in the reference pixel range selecting pixel range or each reference pixel range. When a reference pixel range corresponding to the selected pixel-value set exists in plural form, a reference pixel range in which pixels is largest in number, is selected.

In doing so, the number of reference pixels and the type of pixel value can be adjusted according to local image characteristics. Thus, the pixels are used as many as possible as reference pixels so that a compression rate is improved. Further, since the pixel value is represented by a pixel-value set whose number of elements is as less as possible, the number of states can be reduced, so that a compression cost can be cut down.

[Second Embodiment]

A second embodiment of the present invention will next be described. In the present embodiment, the number of types of pixel values (the number of elements of pixel-value sets) is the same and pixel values (elements) different in combination from one another are prepared in plural form. Even when the number of pixel-value types is four, for example, their variations are prepared in plural form and the less number of types of pixel values is set so as to be able to handle the distribution of many pixel values.

Figure 10:
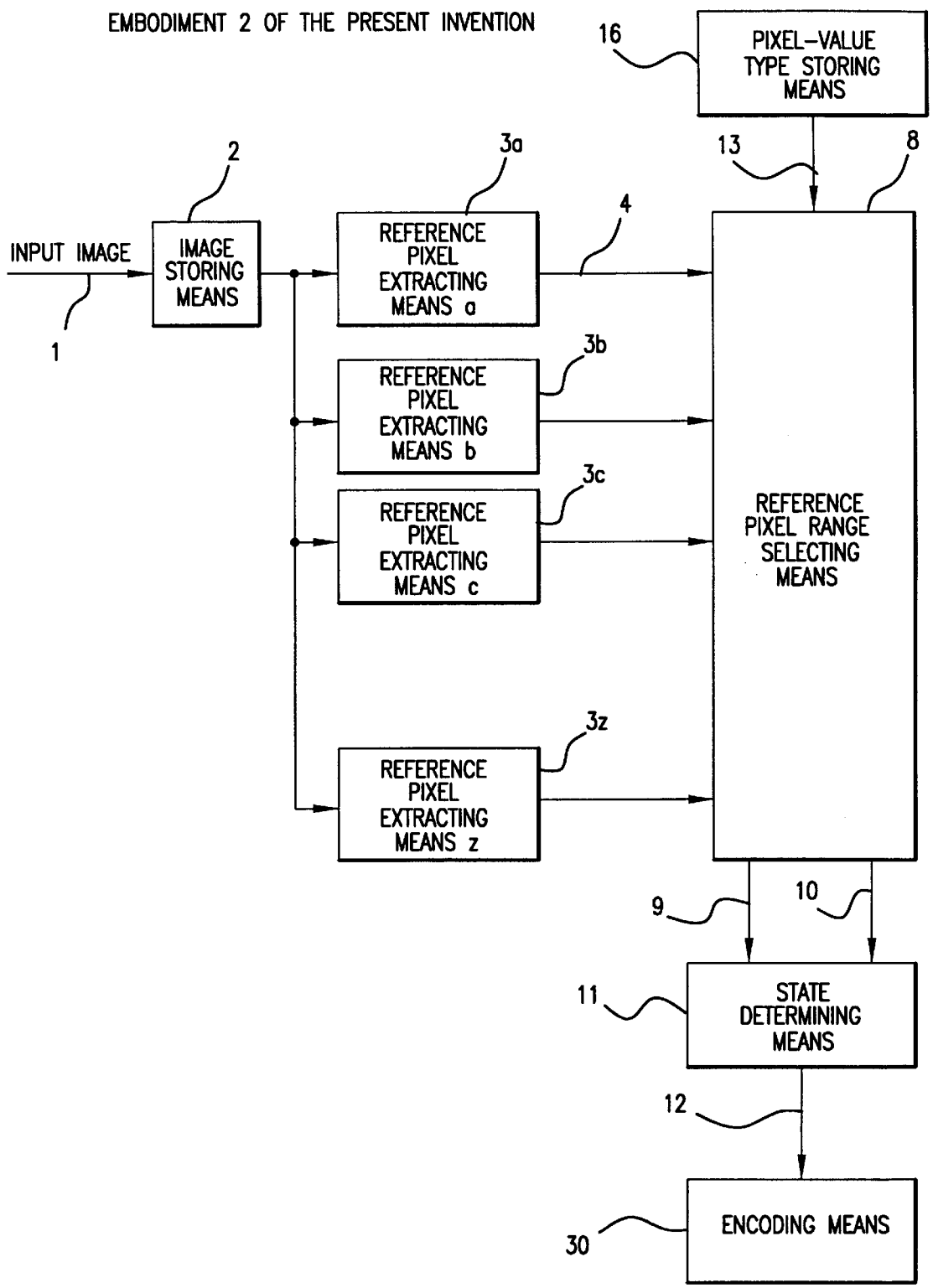
FIG. 10 is a block diagram showing a configuration of a second embodiment of the present invention.

FIG. 10 shows the overall image encoding device according to the second embodiment. In the same drawing, components or parts corresponding to those shown in FIG. 1 are identified by their corresponding reference numerals and their detailed description will be omitted. Referring to FIG. 10, reference numeral 13 indicates a pattern of the type of pixel value. Reference numeral 16 indicates pixel-value type storing means for storing pixel-value type patterns therein. Reference numeral 15 indicates a selected pixel-value type pattern.

In the first embodiment, only the pixel-value type of one pattern using 0 and 255 is set when the two values are used, and only the pixel-value type of one pattern using 0, 64, 128 and 192 is set when the four values are used. However, a plurality of patterns can be prepared in the second embodiment. As shown in FIG. 11 by way of example, four types of pixel-value type patterns are prepared in advance for four values. Further, three types of pixel-value type patterns are prepared for two values.

The above-described pixel-value type patterns are stored in the pixel-value type storing means 16. Reference pixel range selecting means 8 checks whether reference pixels and reference pixel range selecting ranges extracted by their corresponding reference pixel extracting means 3 can be represented in the form of the pixel-value type patterns stored in the pixel-value type storing means 16. The reference pixel range selecting means 8 outputs the pixel value ranges that could be represented by the pixel-value type patterns stored in the pixel-value type storing means 16, to state determining means 11. When a plurality of pixel value ranges can be represented by the pixel-value type patterns stored in the pixel-value type storing means 16, the reference pixel range selecting means 8 selects one widest in range. Further, the reference pixel range selecting means 8 outputs a selected pixel-value type pattern number 15 to the state determining means 11.

FIG. 12 illustrates an example in which the relationship between the number of reference pixels, the number of types of pixel values, the number of pixel-value type patterns and the number of states has been designed. The state determining means 11 generates a state number 12 from the selected reference pixel range, reference pixels and pixel-value type pattern number. When the above relationship is designed as shown in FIG. 12, for example, the total number of states is given by $2^{16}+2^{12}\times 4+2^{12}\times 3$ and numbers can be assigned to the respective states so that the states do not overlap each other.

[Third Embodiment]

A third embodiment of the present invention will next be described. In the second embodiment, the pixel-value type patterns have been fixed. In the third embodiment, however, the pixel-value type patterns are dynamically varied.

Figure 13:
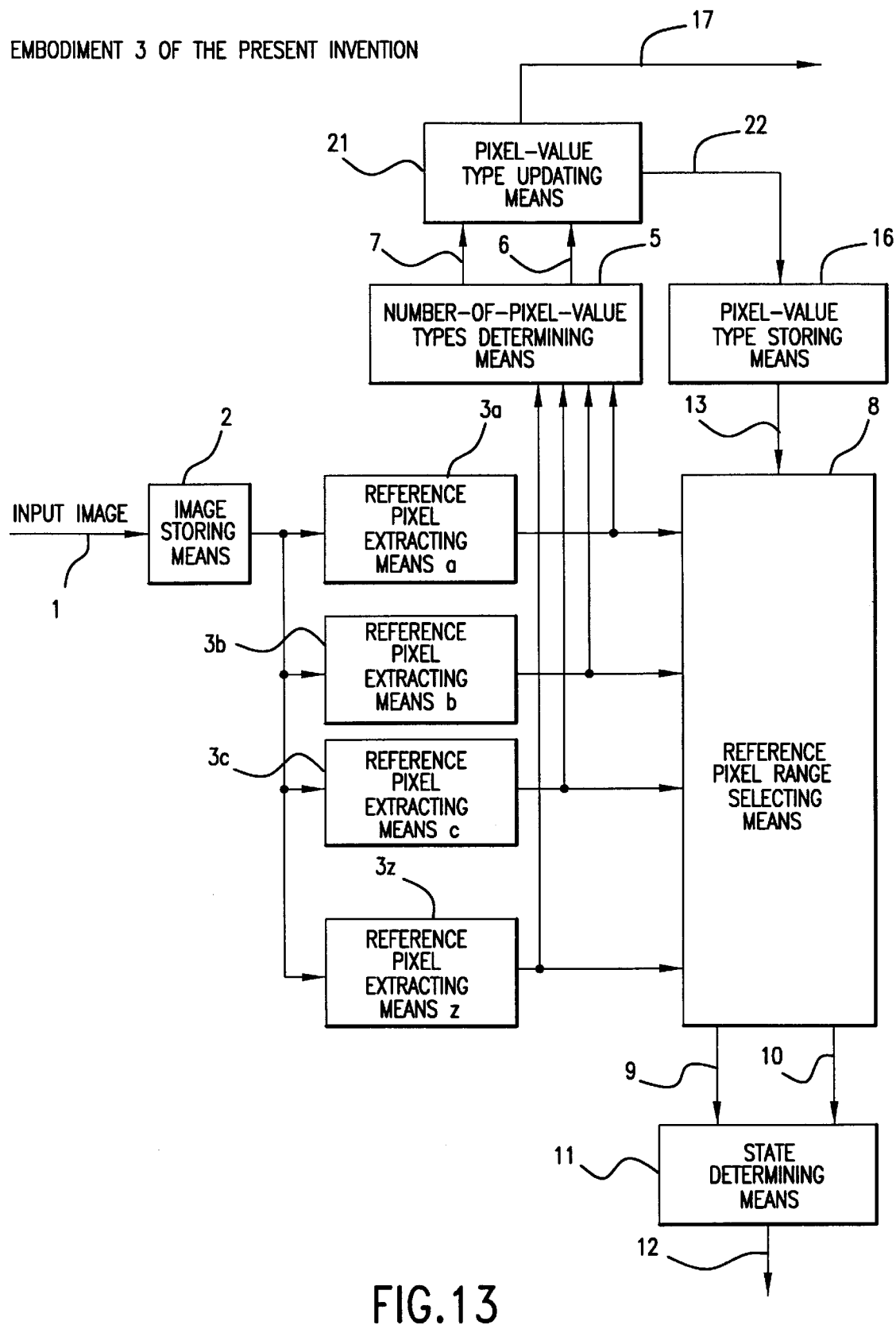
FIG. 13 is a block diagram showing a configuration of a third embodiment of the present invention.

FIG. 13 shows the overall image encoding device according to the third embodiment. In the same drawing, components or parts corresponding to those shown in FIG. 1 or 10 are identified by their corresponding reference numerals and their detailed description will be omitted. Referring to FIG. 13, pixel-value type updating means 21 receives a pixel-value type pattern determined by a number-of-pixel-value types determining means 5 and varies it. When the pixel-value type updating means 21 has varied the pixel-value type pattern, the pixel-value type updating means 21 outputs a pixel-value type pattern update signal 17 therefrom.

The number-of-pixel-value types determining means 5 counts the numbers of pixel-value types for their corresponding reference pixels. If x1=64, x2=128, x3=0, x4=0, x5 =192 and x6=64 when the number of reference pixels and the number of pixels in a reference pixel range selecting range are 6, for example, then the produced pixel values are four types represented by 0, 64, 128 and 192 and hence the number of pixel-value types is four. If x1=64, x2=128, x3=0, x4=0, x5=192 and x6=255, then the produced pixel values are five types given by 0, 64, 128, 192 and 255 and hence the number of pixel-value types is five.

The relationship between the number of reference pixels and the number of pixel-value types is defined as shown in FIG. 12 as an example. Reference pixel range selecting means 8 selects a reference pixel range in which the number of pixel-value types is smaller than that defined in FIG. 12. When the numbers of pixel-value types in a plurality of reference pixel ranges are smaller than the numbers defined in FIG. 12, the reference pixel range selecting means 8 selects the widest reference pixel range.

Arbitrary pixel-value type patterns are prepared in pixel-value type storing means 16 in advance as initial values. When the pixel-value types in the reference pixel range selected by the reference pixel range selecting means 8 have been stored in the pixel-value type storing means 16, the reference pixel range selecting means 8 outputs a pixel-value type pattern number 15 to state determining means 11 in a manner similar to the second embodiment. The state determining means 11 generates a state number 12 from the selected reference pixel range, reference pixels and pixel-value type pattern number.

Figure 14:
FIG. 14 is a diagram for describing pixel value type storing means employed in the third embodiment shown in FIG. 13.

When the pixel-value types of the reference pixels and the reference pixel range selecting range both selected from each reference pixel extracting means 3 are a predetermined number of pixel-value types and are not stored in the pixel-value type storing means 16, the pixel-value type patterns in the pixel-value type storing means 16 are updated. As shown in FIG. 14, the order in which the respective pixel-value type patterns are deleted, is determined and the pixel-value type pattern whose deleting order is fastest, is deleted. A newly-generated pixel-value type pattern that is referred to this time, is stored in the pixel-value type storing means 16 so as to reach the latest deleting order. Simultaneously, the order in which other pixel-value type patterns are deleted, is incremented one by one.

Since it is necessary to update a code table or predicted values indicative of the states of pixel-value type patterns when the pixel-value type patterns are brought up to date, the reference pixel range selecting means 8 outputs a pixel-value type pattern update signal 7 therefrom.

A method of changing the pixel-value type will next be described in detail. In the reference pixel range selecting range shown in FIG. 8, for example, the following two-type pixel-value pattern changing methods are considered. The first changing method will first be explained. Pixel-value patterns are updated only after the encoding of the width of an input image has been terminated, i.e., the numbers of pixel-value types in the reference pixel range selecting ranges corresponding to all of the regions A, B, C and D in FIG. 8 have been measured. According to the second changing method, pixel-value patterns are updated simultaneously with the completion of measurement of the number of pixel-value types in the reference pixel range selecting range corresponding to the region A. In this case, it is necessary to hold at least four types of pixel-value patterns corresponding to the regions A, B, C and D.

In the reference pixel range selecting pixel range shown in FIG. 9, for example, the pixel-value pattern is updated for each pixel.

Figure 15:
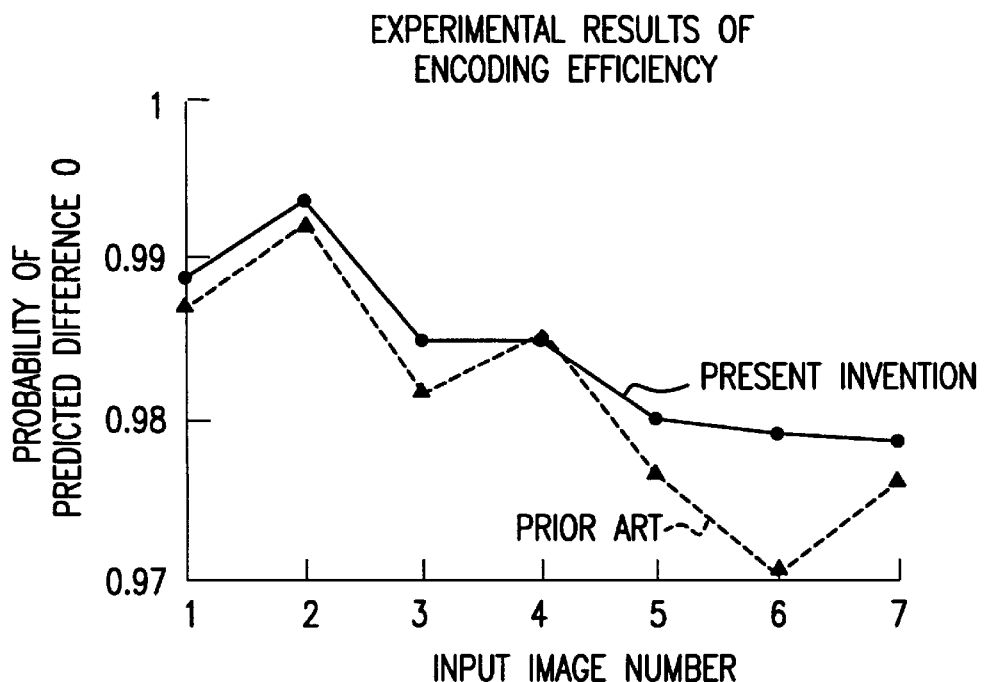
FIG. 15 is a diagram showing the result of an experiment in the efficiency of encoding, which is obtained in the third embodiment shown in FIG. 13.
Figure 16:
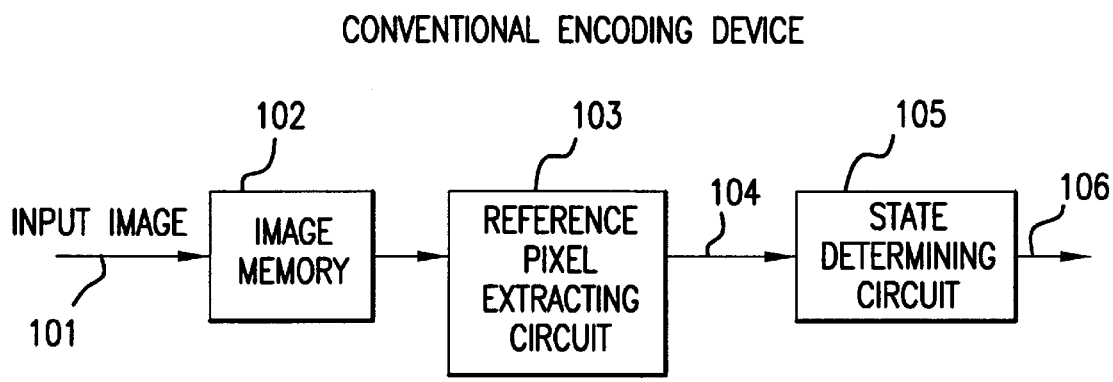
FIG. 16 is a diagram showing a conventional encoding device.

Encoding efficiency at the time that the pixel-value patterns are updated every pixels using the reference pixel range selecting pixel range shown in FIG. 9, will be explained. As the number of reference pixels, the number of pixel-value types and the number of pixel-value patterns, those shown in FIG. 5 were used. For comparison, encoding efficiency at the time that the positions of reference pixels are fixed to two pixels shown in FIG. 16, will be also explained. The probability that a differential value predicted for each state of a Markov model will reach 0, is represented as the axis of ordinates and an input image number is represented as the axis of abscissas. The high probability that the predicted differential value will reach 0, provides good encoding efficiency. The result of an experiment in the encoding efficiency will be shown in FIG. 15. As shown in FIG. 15, the encoding efficiency can be increased by changing the reference pixel range.

An increase in the reference pixel range and an improvement in the encoding efficiency have not heretofore been achieved because the reference pixel range at the Markov model encoding is constant. However, as described above, the present invention can bring about an advantageous effect in that the encoding efficiency can be improved by widening the reference pixel range when the type of pixel value for an input image is few in number and narrowing the reference pixel range when the type thereof is large in number.

What is claimed is:

1. A Markov model image encoding device comprising:
   image storing means for storing an input image therein;
   reference pixel range determining pixel extracting means for extracting pixels in a corresponding reference pixel range candidate and pixels in each of a plurality of reference pixel range selecting pixel ranges from said image storing means for each of a plurality of reference pixel range candidates;
   reference pixel range selecting means for selecting a reference pixel range from said reference pixel range candidates, based on the values of the pixels in the reference pixel range candidates and the values of the pixels in said each of a plurality of reference pixel range selecting pixel ranges extracted by said reference pixel range determining pixel extracting means;
   state determining means for determining a state of a pixel to be noted, based on the values of pixels in said selected reference pixel range; and
   means for encoding said noted pixel, based on said determined state.

2. A Markov model image encoding device according to claim 1, wherein said reference pixel range selecting means selects a reference pixel range candidate widest in range as said reference pixel range from reference pixel range candidates in which the values of the pixels in said corresponding reference pixel range candidate and the values of the pixels in said each reference pixel range selecting pixel range become pixel values in a pixel-value set predetermined with respect to said corresponding reference pixel range candidate.

3. A Markov model image encoding device according to claim 1, wherein said reference pixel range selecting pixel range is a pixel range in which the number of pixels in a line direction is the number of pixels less than or equal to the number of pixels corresponding to one line and the number of pixels in the direction orthogonal to said line direction is at least one pixel, the boundary between the reference pixel range selecting pixel ranges is predetermined, and said reference pixel range is selected from a reference pixel range selecting pixel range nearest to a pixel to be noted.

4. A Markov model image encoding device according to claim 1, wherein said reference pixel range selecting pixel range is a pixel range in which the number of pixels in a line direction is the number of pixels corresponding to one line and the number of pixels in the direction orthogonal to the line direction is at least one pixel, and the boundary between the reference pixel range selecting pixel ranges is changed according to the position of a pixel to be noted.

5. A Markov model image encoding device according to claim 1, further including pixel-value set storing means for storing pixel-value sets defined in advance every said reference pixel range candidates and wherein said reference pixel range selecting means selects said reference pixel range from reference pixel range candidates in which a distribution of the values of pixels in said reference pixel range candidate and pixels in said reference pixel range selecting pixel ranges corresponds to the pixel-value sets stored in said pixel-value set storing means with respect to said reference pixel range candidates.

6. A Markov model image encoding device according to claim 5, further including pixel-value set changing means and wherein when said pixel-value distribution uncorresponds to the pixel-value sets about all the reference pixel candidates, one pixel-value set is deleted from said pixel-value set storing means and said pixel-value distribution is newly stored in said pixel-value set storing means as a pixel-value set.

7. A Markov model image encoding device according to claim 6, wherein a change in pixel-value set is performed every regions composed of one line or more, including reference pixel range selecting pixel ranges in which a plurality of boundaries are fixed.

8. A Markov model image encoding device according to claim 6, wherein a change in pixel-value set is performed every reference pixel range selecting pixel ranges in which their boundaries are fixed.

9. A Markov model image encoding device according to claim 6, wherein said reference pixel selecting pixel ranges are shifted together with pixels to be noted and a change in pixel-value set is performed for each pixel to be noted.

10. A Markov model image encoding device comprising:
    means for detecting one or more pixel-value sets borne by the values of pixels included in a predetermined range including at least a plurality of reference pixel range candidates, every pixels to be noted with respect to the plurality of reference pixel range candidates;
    means for selecting a reference pixel range candidate having the maximum number of pixels from reference pixel range candidates associated with pixel-value sets having the minimum number of elements, of said detected pixel-value sets;
    means for determining a state of said each noted pixel based on the values of pixels in said selected reference pixel range; and
    means for encoding said noted pixel based on said state.

11. An image encoding device, comprising:
    image pixel data storing means for storing image pixel data;
    reference pixel extracting means for extracting, from the image pixel data, a reference pixel and a reference pixel selecting range, for each of a plurality of reference pixel range candidates, wherein the configuration of the reference pixel range candidate is independent of pixel values of the image pixel data;
    reference pixel range selecting means for selecting a reference pixel range from the plurality of reference pixel range candidates, based on values of the pixels in the reference pixel range candidate and the values of the pixels in the corresponding reference pixel selecting ranges extracted by the reference pixel extracting means;
    state determining means for determining a state of a noted pixel, based on values of pixels in the selected reference pixel range; and
    means for encoding the noted pixel, based on the determined state.

12. The image encoding device of claim 11, wherein the reference pixel range selecting means selects, as the reference pixel range, a reference pixel range candidate that is widest in range as the reference pixel range from reference pixel range candidates in which the values of the pixels in the corresponding reference pixel range candidate and the values of the pixels in each reference pixel selecting range become pixel values in a pixel-value set predetermined with respect to the corresponding reference pixel range candidate.

13. The image encoding device of claim 11, wherein the reference pixel selecting range is a pixel range in which the number of pixels in a line direction is the number of pixels less than or equal to the number of pixels corresponding to one line and the number of pixels in the direction orthogonal to said line direction is at least one pixel, the boundary between the reference pixel selecting ranges is predetermined, and the reference pixel range is selected from a reference pixel selecting range nearest to the noted pixel.

14. The image encoding device of claim 11, wherein the reference pixel selecting range is a pixel range in which the number of pixels in a line direction is the number of pixels corresponding to one line and the number of pixels in the direction orthogonal to the line direction is at least one pixel, and the boundary between the reference pixel selecting ranges is changed according to the position of the noted pixel.

15. The image encoding device of claim 11, further comprising pixel-value set storing means for storing pixel values sets defined in advance for every reference pixel range candidate and wherein the reference pixel range selecting means selects the reference pixel range from reference pixel range candidates in which a distribution of the values of pixels in the reference pixel selecting range corresponds to the pixel-value sets stored in the pixel-value set storing means with respect to the reference pixel range candidates.

16. The image encoding device of claim 15, further comprising pixel-value set changing means, wherein when a pixel-value distribution does not correspond to the pixel-value sets about all the reference pixel candidates, one pixel-value set is deleted from the pixel-value set storing means and the pixel-value distribution is newly stored in the pixel-value set storing means as a pixel-value set.

17. The image encoding device of claim 16, wherein a change in pixel-value set is performed for every region composed of one or more lines, including reference pixel selecting ranges in which a plurality of boundaries are fixed.

18. The image encoding device of claim 16, wherein a change in pixel-value set is performed for every reference pixel selecting range in which the boundaries are fixed.

19. The image encoding device of claim 16, wherein the reference pixel selecting ranges are shifted together with noted pixels and a change in pixel-value set is performed for each noted pixel.

20. A method of encoding an image, comprising:

storing image pixel data;

extracting, from the image pixel data, a reference pixel and a reference pixel selecting range, for each of a plurality of reference pixel range candidates, wherein the configuration of the reference pixel range candidates is independent of pixel values of the image pixel data;

selecting a reference pixel range from the plurality of reference pixel range candidates, based on values of the extracted reference pixels in the reference pixel range candidates and the corresponding reference pixel selecting ranges;

determining a state of a noted pixel, based on values of pixels in the selected reference pixel range; and encoding the noted pixel, based on the determined state.

21. The method of claim 20, wherein the selected reference pixel range is a reference pixel range candidate that is widest in range from reference pixel range candidates in which the values of the pixels in the corresponding reference pixel range candidate and the values of the pixels in each reference pixel selecting range become pixel values in a pixel-value set predetermined with respect to the corresponding reference pixel range candidate.

22. The method of claim 20, wherein the reference pixel selecting range is a pixel range in which the number of pixels in a line direction is the number of pixels less than or equal to the number of pixels corresponding to one line and the number of pixels in the direction orthogonal to said line direction is at least one pixel, the boundary between the reference pixel selecting ranges is predetermined, and the reference pixel range is selected from a reference pixel selecting range nearest to the noted pixel.

23. The method of claim 20, wherein the reference pixel selecting range is a pixel range in which the number of pixels in a line direction is the number of pixels corresponding to one line and the number of pixels in the direction orthogonal to the line direction is at least one pixel, and the boundary between the reference pixel selecting ranges is changed according to the position of the noted pixel.

24. The method of claim 20, further comprising storing pixel values sets defined in advance for every reference pixel range candidate, wherein the reference pixel range is selected from reference pixel range candidates in which a distribution of the values of pixels in the reference pixel selecting range corresponds to the stored pixel-value sets with respect to the reference pixel range candidates.

25. The method of claim 24, wherein when a pixel-value distribution does not correspond to the pixel-value sets about all the reference pixel candidates, one pixel-value set is deleted from the stored pixel-value sets and the pixel-value distribution is newly stored as a pixel-value set.

26. The method of claim 25, wherein a change in pixel-value set is performed for every region composed of one or more lines, including reference pixel selecting ranges in which a plurality of boundaries are fixed.

27. The method of claim 25, wherein a change in pixel-value set is performed for every reference pixel selecting range in which the boundaries are fixed.

28. The method of claim 25, wherein the reference pixel selecting ranges are shifted together with noted pixels and a change in pixel-value set is performed for each noted pixel.

* * * * *